(No Model.)
N. C. PETRIE.
BEE SWARMER.
No. 437,451. Patented Sept. 30, 1890.
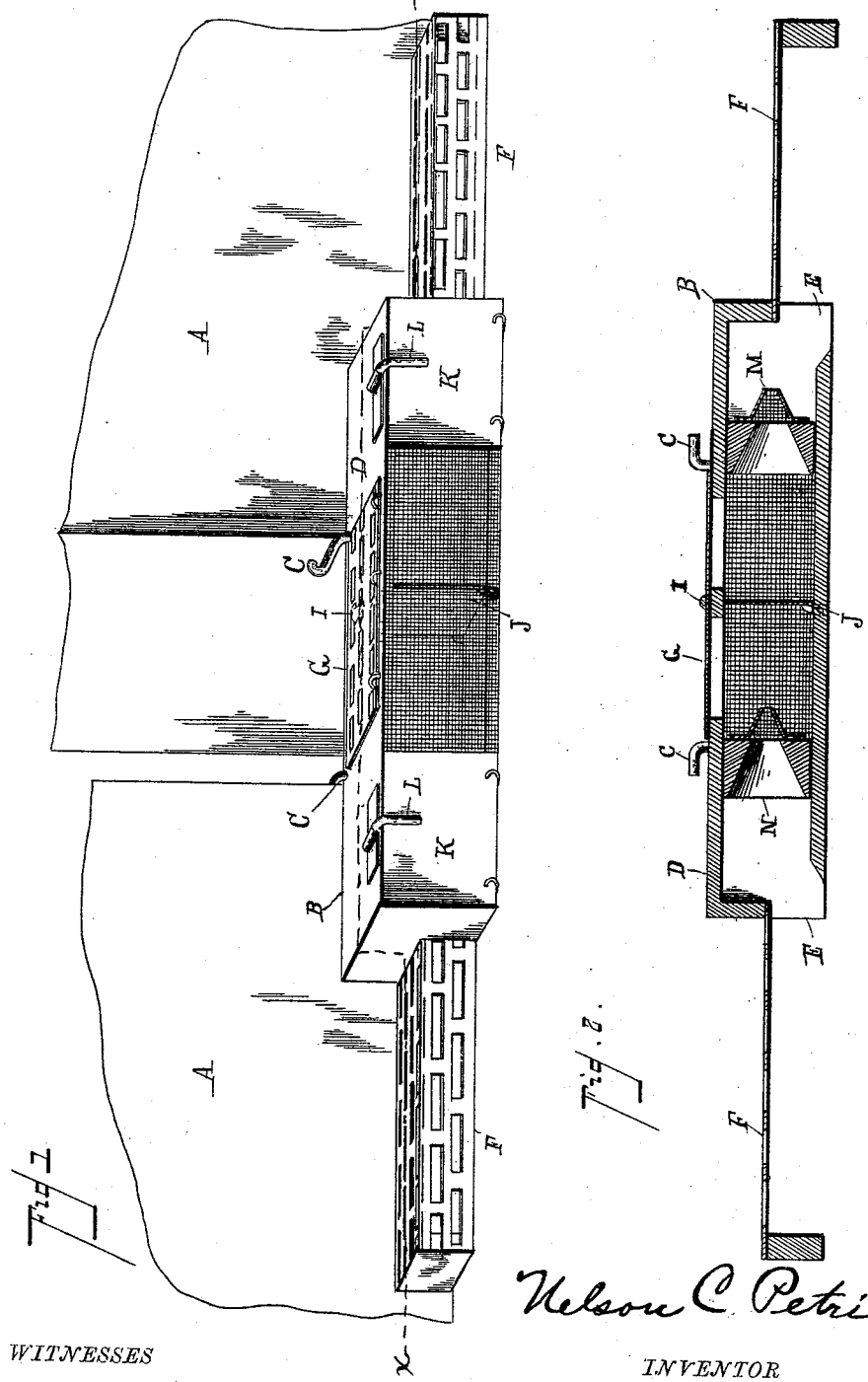
WITNESSES
T. Willoughby
R. N. Bishop
INVENTOR
Nelson C. Petrie
By W. T. Fitzgerald
Attorney

UNITED STATES PATENT OFFICE.

NELSON C. PETRIE, OF CHERRY VALLEY, OHIO.

BEE-SWARMER.

SPECIFICATION forming part of Letters Patent No. 437,451, dated September 30, 1890.

Application filed March 21, 1890. Serial No. 344,715. (No model.)

*To all whom it may concern:*

Be it known that I, NELSON C. PETRIE, a citizen of the United States, residing at Cherry Valley, in the county of Ashtabula and State of Ohio, have invented certain new and useful Improvements in Bee-Swarmers; and I do hereby declare the following to be a full, clear, and exact description of the invention, such as will enable others skilled in the art to which it appertains to make and use the same.

My invention is an improved attachment for bee-hives, intended especially for the purpose of directing a swarm of bees into an empty hive; and it consists in certain novel features, which will be hereinafter pointed out.

In the accompanying drawings, Figure 1 is a perspective view of my improved attachment in its operative position. Fig. 2 is a longitudinal section of the attachment on the line $xx$ of Fig. 1, looking toward the hives.

Referring to the drawings by letters, A A designate the hives of the usual or any preferred construction, and B is my improved attachment hung on the hives by the hooks C C, which are secured in the upper side of the attachment and engage the hives in any desired manner. The said attachment consists primarily of an elongated box D, having the openings E in its ends and the deflecting cages or guideways F leading longitudinally from the said openings. These deflecting cages or guideways are composed of perforated sheet metal or other similar suitable material, the perforations being of such a size as to permit the workers to pass readily therethrough, but to prevent the passage and escape of the drones and the queen. The guideways or deflecting cages are entirely open on the side facing the hives, so that the bees can freely enter the said guideways and will be by them directed into my attachment. They are also open on the bottom so as to effect an economy of material. As the open bottom will generally be covered by the ledge in front of the hives the bees will be prevented from passing therethrough. The front and rear sides of the box D are left open and covered by wire-screening, so that the passage of the bees through the attachment or their movement within the same can be observed. In the upper side of the box I provide a trap-door or cover G, which is similar in its construction to the guideways, so that the workers can pass through the same, but the escape of the drones and the queen will be prevented. This trap-door or cover is held in its closed position by the button I, as clearly shown, and within the box, at about the center of the same, I provide the swinging partition J, which is turned upward to the trap-door G, to adapt the attachment for use as a double drone-trap. On the front side of the box at the ends of the same I provide the doors K, which are held in their raised closed position by the hooks or latches L, mounted on the top of the box, as shown, and within the box adjacent to the said doors I provide or arrange the removable tubes M, which are formed of screen-cloth, preferably, and are substantially conical in shape. The apexes of the tubes are open, and their bases are secured to the blocks N, having centrally-flared openings, as shown. These blocks and tubes can be removed and reversed through the doors K, as will be readily understood.

The construction and arrangement of the several parts of my device being thus made known, the manner of using the same will be readily understood.

The device is hung upon the hives in the manner shown in Fig. 1, with the open sides of the guideways toward the hives. If the wire tubes M be arranged so that they both point in the same direction, the device will be arranged to direct the swarm into the empty hive. If the said tubes be arranged so as to point toward each other, the device will be arranged as a drone-trap, the drones being permitted to pass toward the center of the box, but prevented from passing from the same.

My improved attachment is extremely simple in its construction, and its advantages are thought to be obvious from the foregoing description, taken in connection with the accompanying drawings, without further detailed reference thereto.

Having thus described my invention, what I claim, and desire to secure by Letters Patent, is—

1. The combination of the box having the perforated sides, and having at its top the cover formed with the series of openings adapted to permit of the passage through them of the workers, but prevent the passage of the drones and queen, the horizontally-disposed conical tubes removably fitted within the box, and having their apexes pointed in the same direction, and perforated guideways having each an open side and leading from the ends of the box to the mouths of the hives, substantially as set forth.

2. The combination of a box having openings in its ends, a perforated trap-door in its top, and provided with perforated sides, the perforated guideways leading from the end openings to the mouths of the hives, conical tubes removably fitted in the box, and a vertically-swinging partition within the box, as set forth.

In testimony whereof I affix my signature in presence of two witnesses.

NELSON C. PETRIE.

Witnesses:
ARTHUR BENJAMIN,
MACK HALL.